United States Patent
Thacker, III et al.

(10) Patent No.: US 9,393,799 B2
(45) Date of Patent: *Jul. 19, 2016

(54) SYSTEMS AND METHODS FOR VERIFYING A CHIP

(71) Applicants: William Eli Thacker, III, Sanford, NC (US); Lynton R. Burchette, Whispering Pines, NC (US); Scott Martin Babish, Fuquay Varina, NC (US)

(72) Inventors: William Eli Thacker, III, Sanford, NC (US); Lynton R. Burchette, Whispering Pines, NC (US); Scott Martin Babish, Fuquay Varina, NC (US)

(73) Assignee: Static Control Components, Inc., Sanford, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,072

(22) Filed: Oct. 24, 2014

(65) Prior Publication Data
US 2015/0042457 A1 Feb. 12, 2015

Related U.S. Application Data

(63) Continuation of application No. 13/280,967, filed on Oct. 25, 2011, now Pat. No. 8,872,635.

(51) Int. Cl.
*B41J 2/175* (2006.01)
*H04Q 5/22* (2006.01)

(52) U.S. Cl.
CPC .......... *B41J 2/17546* (2013.01); *B41J 2/17506* (2013.01); *H04Q 5/22* (2013.01); *H04Q 2213/13095* (2013.01)

(58) Field of Classification Search
CPC ............. B41J 2/17506; B41J 2/17546; H04Q 2213/13095; H04Q 5/22; G06K 7/0008; G06K 19/0723; G06K 7/10039; G06K 2017/0045; G08B 13/2462
USPC ................ 340/10.1, 10.3, 10.4, 10.41, 10.42; 347/5, 7, 19, 84, 85, 86, 87; 714/738, 714/743; 365/200
See application file for complete search history.

(56) References Cited

U.S. PATENT DOCUMENTS

| | | | | |
|---|---|---|---|---|
| 6,644,771 | B1* | 11/2003 | Silverbrook | 347/19 |
| 6,816,968 | B1* | 11/2004 | Walmsley | 713/168 |
| 7,363,566 | B2* | 4/2008 | Goishi | 714/738 |
| 7,971,947 | B2* | 7/2011 | Burchette | 347/7 |
| 2003/0076713 | A1* | 4/2003 | Emery | 365/200 |
| 2005/0213761 | A1* | 9/2005 | Walmsley et al. | 380/255 |
| 2006/0271832 | A1* | 11/2006 | Goishi | 714/743 |
| 2009/0251513 | A1* | 10/2009 | Burchette | 347/86 |

* cited by examiner

*Primary Examiner* — Sisay Yacob

(57) ABSTRACT

Disclosed is a system and method for verifying a chip having a memory. Remanufacturers of imaging devices, such as inkjet printers or electrostatic printers, often have to use a replacement chip in order to reuse an imaging cartridge. It is desirable to have a system and method for determining if the replacement chip is suitable for use with a specific imaging cartridge. Also, it may be desirable to confirm that the chip was manufactured by a specific manufacturer. The disclosed system and method allow the remanufacturer a reliable and efficient way to verify chips.

8 Claims, 2 Drawing Sheets

SYSTEMS AND METHODS FOR VERIFYING A CHIP

This application is a continuation of U.S. patent application Ser. No. 13/280,967 entitled "Systems and Methods for Verifying a Chip", filed Oct. 25, 2011, which is incorporated by reference herein in its entirety.

BACKGROUND

In the imaging industry, there is a growing market for the remanufacture and refurbishing of various types of replaceable imaging components such as toner cartridges, ink cartridges, and the like. Imaging cartridges, once spent, are unusable for their originally intended purpose. Without a refurbishing process, these cartridges would simply be discarded, even though the cartridge itself may still have potential life. As a result, techniques have been developed to remanufacture imaging cartridges. These processes may entail, for example, the disassembly of the various structures of the cartridge, replacing toner or ink, cleaning, adjusting or replacing any worn components and reassembling the cartridge.

Some imaging cartridges may include a chip having a memory device which is used to store data related to the cartridge or an imaging device, such as a printer, for example. The printer reads this data to determine certain printing parameters and communicate information to the user. For example, the memory may store the model number of the cartridge so that the printer may recognize the cartridge as one which is compatible with that particular printer. Additionally, by way of example, the cartridge memory may store the number of pages that can be expected to be printed from the cartridge during a life cycle of the cartridge and other useful data. The printer may also write certain data to the memory device, such as the amount of ink or toner remaining in the cartridge. Other data stored in the cartridge may relate to the usage history of the imaging cartridge.

It is often necessary to provide a replacement chip in order to remanufacture an imaging cartridge. Remanufacturers have developed "dedicated" replacement chips, i.e. chips that mimic an original equipment manufacture's (OEM) chip and are designed to be used for a specific imaging cartridge. Remanufactures have also developed "universal" chips which are chips that may be used with different imaging cartridges of different models. Additionally, remanufactures have developed "multibrand" chips which may be used on imaging cartridges sold by different manufacturers. Remanufacturers have also developed "multiregion" chips which are chips that work in more than one geographic region even though the OEM has regionalized printers.

It is desirable for the remanufacturer to test chips before placing them onto imaging cartridges. This allows the remanufacturer to verify that chip is suitable for the cartridge type. Also, this allows the remanufacturer to verify the maker of the chip and whether the chip contains virgin data or non-virgin data. U.S. Pat. No. 7,971,497 discloses a chip verifier that enables a remanufacturer to verify if the new ink jet chips attached to the remanufactured ink jet cartridges are new ink jet chips, if the new ink jet chips attached to the remanufactured ink jet cartridges were manufactured by a predetermined manufacturer of new ink jet chips, if the new ink jet chips attached to the remanufactured ink jet cartridges are functional, and if the new ink jet chips attached to the remanufacture ink jet cartridges are a predetermined type of new ink jet chip. This patent is incorporated by reference.

SUMMARY

The present method and system allows for a chip to be verified by a potential user. The chip may be a replacement intended to be used on a remanufactured imaging component. Alternatively the chip may be any other type of semiconductor chip and may be intended to be used on a newly manufactured imaging component.

The method includes verifying a chip by receiving a read command, receiving a write command, writing data to a test area in response to the write command, and transmitting data in response to the read command. The transmitted data is used to validate the chip as a proper chip.

By implementing this method a chip can be verified to determine if it is suitable for its intended use. For example, a chip can be verified as a suitable replacement chip for a remanufactured imaging cartridge.

In another embodiment the method includes verifying a chip by sending a a sync signal to the chip, sending a dummy word having a valid read command to the chip, sending a first value to the chip, sending a second value to the chip, sending a third value to the chip, sending a fourth value to the chip, and checking for a response from the chip. The chip responds with a sync signal and four values if the chip has been verified and the chip does not respond if it has not been verified.

The methods can be performed using a standalone chip verifier. Alternatively, the methods can be performed within the imaging device or by another suitable means or device.

These and other features and objects of the invention will be more fully understood from the following detailed description of the embodiments, which should be read in light of the accompanying drawings.

In this regard, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description, serve to explain the principles of the invention.

DETAILED DESCRIPTION

The following detailed description of preferred embodiments refers to the accompanying drawings which illustrate specific embodiments of the invention. In the discussion that follows, specific systems and techniques for repairing or remanufacturing an inkjet cartridge including a memory element are disclosed. Other embodiments having different structures and operations for the repair of other types of replaceable imaging components and for various types of imaging devices do not depart from the scope of the present invention.

Figure 1:
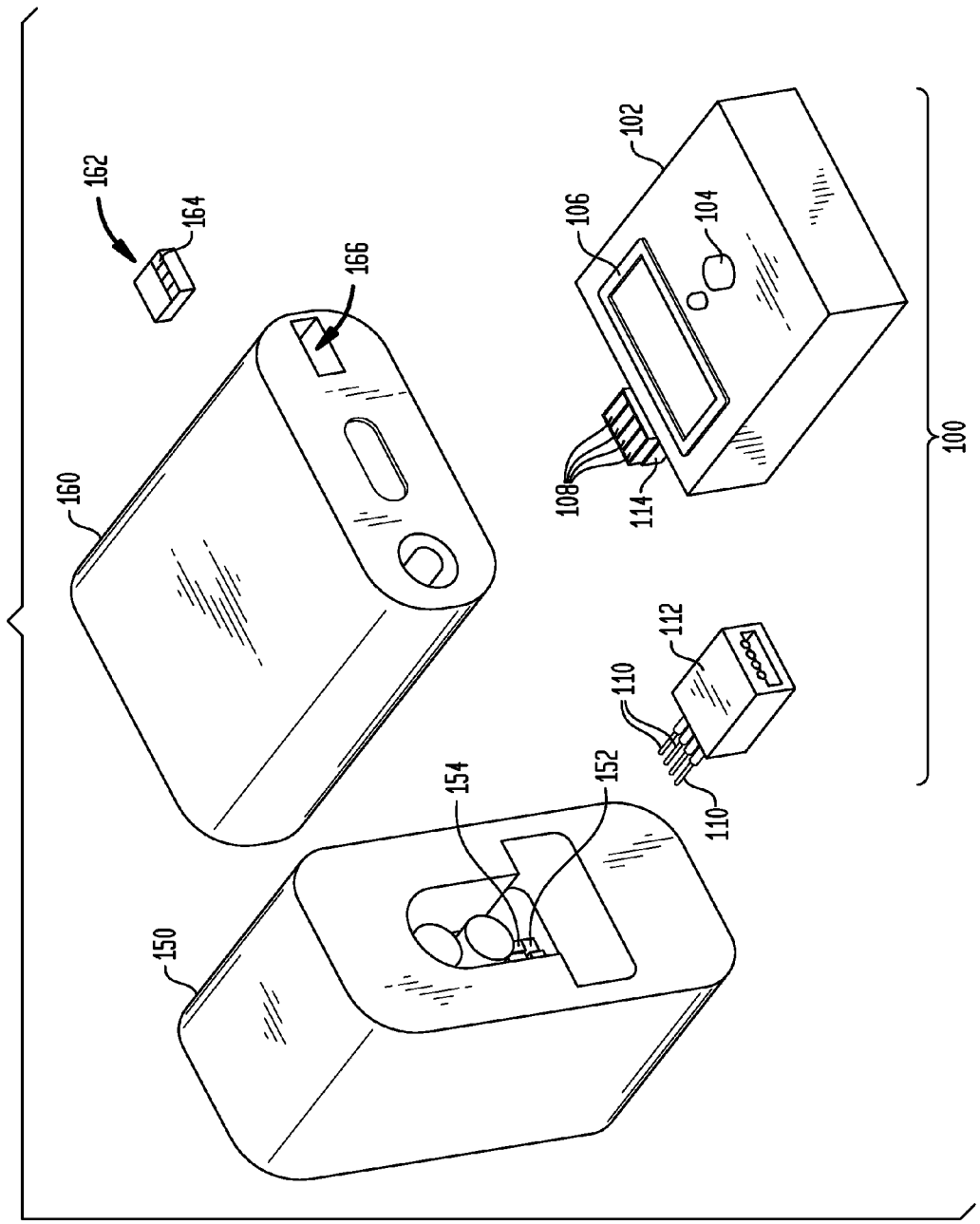
FIG. 1 shows a perspective view of a prior art inkjet remanufacturing chip verifier and exemplary inkjet chips in accordance with the present invention.

FIG. 1 illustrates a perspective view of an inkjet remanufacturing chip verifier 100 in accordance with the present invention. Also shown in FIG. 1 are exemplary remanufactured inkjet cartridges 150 and 160. The inkjet cartridge 150 includes an inkjet chip 152 held in a recess. The inkjet chip 152 includes contacts 154 for communicating with a printer. The inkjet cartridge 160 includes an inkjet chip 162 having contacts 164. The inkjet chip 162 is held in a slot 166 when attached to the inkjet cartridge 160. These new inkjet chips are placed on the used inkjet cartridges 150 and 160 by a remanufacturer when the inkjet cartridges are refilled with ink and refurbished. The new inkjet chips typically include memory and other circuitry to control communication. The data stored in memory of the inkjet chips may include cartridge ink color, cartridge type, date manufactured, cartridge install date, cartridge expiration date, manufacturer name, and ink usage data, for example.

The inkjet remanufacturing chip verifier 100 includes a housing 102 enclosing circuitry described in greater detail below. A user interface may include a one or more input devices 104 that are utilized by a user to control the operation of the inkjet remanufacturing chip verifier 100, or enter data, commands and the like. The input devices 104 may include switches, buttons, a keypad, a microphone, a data input port and the like. The user interface may also include one or more output devices 106 that are utilized to communicate with the user. The output devices 106 may include a display, light emitting diodes (LED), a speaker, data output port and the like. For inkjet chips which communicate directly using one or more contacts or pads (such as inkjet chips 150 and 160), the inkjet remanufacturing chip verifier 100 includes one or more contacts 108 which are used to communicatively connect to the contacts of the inkjet chip in order to transmit data to and receive data from the inkjet chip. Contacts 108 are disposed along a probe tip 114 of the inkjet remanufacturing chip verifier 100 and are adapted for engaging the contacts 164 of the inkjet chip 162 when the inkjet chip is disposed in the slot 166. An extension element 112 including extension pins 110 may be attached to the probe tip 114 to allow the inkjet remanufacturing chip verifier 100 to access the contacts of inkjet chips which are held in a recess, such as contacts 154 of inkjet chip 152.

For inkjet chips which communicate utilizing radio frequency (RF), an RF antenna, rather than contacts 108, may be used in conjunction with appropriate circuitry to allow the inkjet remanufacturing chip verifier 100 to communicate with such devices.

Figure 2:
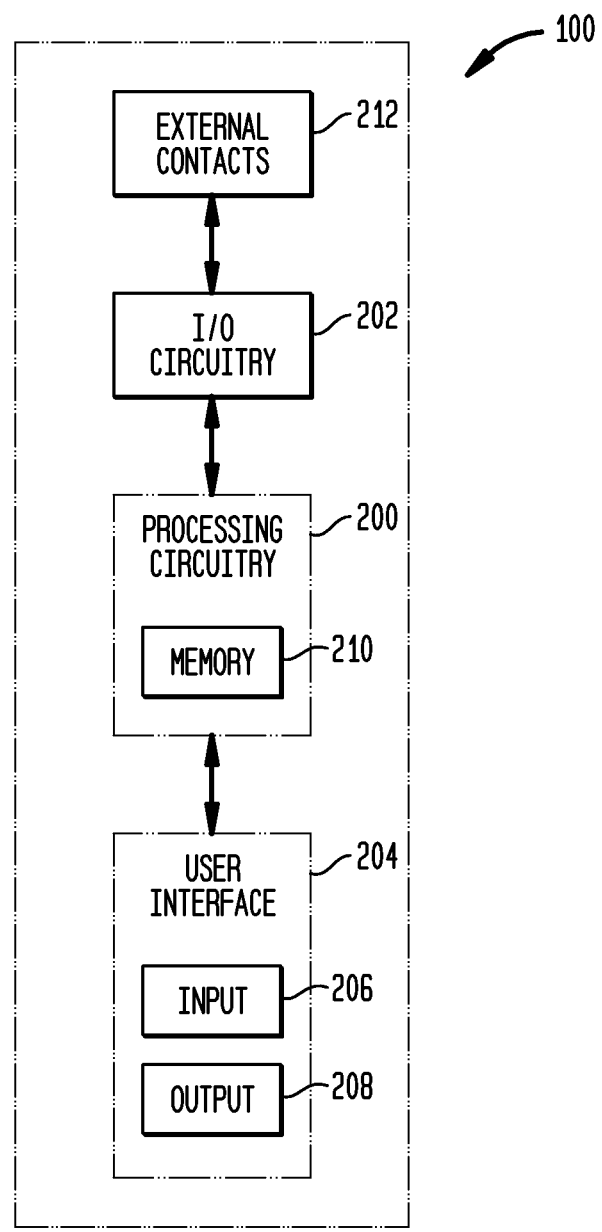
FIG. 2 shows a functional block diagram of a prior art inkjet remanufacturing chip verifier in accordance with the present invention.

FIG. 2 shows a functional block diagram of the inkjet remanufacturing chip verifier 100 in accordance with the present invention. The inkjet remanufacturing chip verifier 100 includes processing circuitry 200 or controller communicatively connected to chip input/output (I/O) circuitry 202 and a user interface 204. The user interface 204 preferably comprises an output device 208, such as a display or LED, for example, and an input device 206, such as a keypad, for example. The processing circuitry 200 includes memory 210 which may suitably comprise both volatile memory and non-volatile memory for storing data and programming code controlling the operation of the inkjet remanufacturing chip verifier 100. The input/output (I/O) circuitry 202 is communicatively connected to external contacts 212 and provides the appropriate components and electronic interface to allow the processing circuitry 200 to communicate with the cartridge memory element through the contacts 212. Electrical power for the operation of the inkjet remanufacturing chip verifier 100 may be suitably provided by one or more batteries, a connection to an external DC source and/or a connection to an AC power source.

The processing circuitry 200 controls the operation of the inkjet remanufacturing chip verifier 100 and performs a variety of operations, as described in greater detail below. The processing circuitry 200 may be suitably implemented as a custom or semi-custom integrated circuit, a programmable gate array, a microprocessor executing instructions from memory, a microcontroller, or the like, for example. The processing circuitry 200 controls the reading of data from the inkjet chip and analysis of that data. The processing circuitry 200 controls the user interface 204, receiving commands and data from the input devices 206 and outputting data, such as analysis results, on the output device 208.

The inkjet remanufacturing chip verifier 100 may be used as a part of a remanufacturing production line in which used inkjet cartridges are refurbished, filled with ink and provided with a new inkjet chip. At the end of the remanufacturing line (after the new inkjet chip has been attached to the remanufactured inkjet cartridge), the inkjet remanufacturing chip verifier 100 may be used to verify certain characteristics of the new inkjet chips, thereby insuring, among other things, that the correct inkjet chip was attached to the remanufactured inkjet cartridge. A user of the inkjet remanufacturing chip verifier 100 may use the input device 206 of the user interface 204 to select a particular type of chip to verify.

By reading data from the memory of the inkjet chip and comparing that read inkjet chip data to reference inkjet chip data stored in the memory 210, the processing circuitry 200 of the inkjet remanufacturing chip verifier 100 may verify, for example, if the inkjet chip is new chip and has not been used, if the inkjet chip was manufactured by a particular manufacturer of inkjet chips, if the inkjet chip is functional and if the inkjet chip is a particular type of inkjet chip. The reference inkjet chip data stored in the memory 210 may include inkjet chip data for a plurality of inkjet chip types, allowing the user to instruct the inkjet remanufacturing chip verifier 100 to determine whether or not a particular chip is present, or determine based the plurality of reference inkjet chip data, what type of chip is present. The reference inkjet chip data may suitably comprise a copy of the data expected to be stored in the memory of the inkjet chips.

The processing circuitry of the inkjet remanufacturing chip verifier 100 may further reject during the process of remanufacturing the ink jet cartridges: ink jet chips attached to remanufactured ink jet cartridges which have been previously used, ink jet chips attached to remanufactured ink jet cartridges which produced by manufacturers other than a particular manufacturer of ink jet chips, ink jet chips attached to remanufactured inkjet cartridges which are not functional, and inkjet chips attached to remanufactured inkjet cartridges which are not a particular type of new inkjet chips.

After the processing circuitry 200 completes the verification and rejection techniques described above, the processing circuitry 200 communicates with the user interface 204 to indicate the verification or rejection of the new ink jet to the user during the process of remanufacturing. For example, if the inkjet chip does not meet certain criteria, the user interface may indicate that status with a light or sound. Alternatively, the details of the type of inkjet chip may be displayed on a display of the user interface 204.

Next, methods of verifying chips will be described. The methods will be described as being performed by the chip verifier. But, these methods can be performed by using any applicable equipment. Furthermore, the methods described are useful for any type of chip having a memory and are not limited to imaging chips or inkjet chips.

The chip verifier determines the chip type by performing a query on the chip presented to it. The return from the query identifies the printer type that the chip is presently pointing to. If the chip identified is possibly part of a universal chip, a multi-brand chip, or a multi-region chip, then the chip verifier starts to remarry the chip to see what other printer types (brands, or regions) it will answer to. The chip verifier can determine what chip type it is. The chip verifier will then re-marry the tag to the original printer data set that was found.

If the chip is determined to be a dedicated tag then the chip verifier tries to re-marry the chip to a predetermined chip. For example, the chip can by re-married to an chip whose data set should not be in the chip, but the data set is stored in one of the memory slots within the dedicated chips. If the marry is successful the chip is verified and gets reported as such. Otherwise, the chip does not get verified (i.e. it is an OEM chip or a competitor chip) the chip verifier reports "no use."

When the chip verifier sees a data set (from an original read) it will also read other chip locations to verify that the data set is still virgin. If the data set is found to be non-virgin a "no use" is reported.

In one embodiment, the chip verification is performed by a sequence. A sync signal, a dummy word, and four values are sent to the chip. If the sequence is transmitted correctly, the chip responds by sending a sync command and four words of data. If the sequence is not transmitted correctly the chip does not respond. It is desirable to allow the chip verifier to test the chip without marrying it to a printer. Therefore, when the chip verifier Read command is successful, the UCAM lock bits do not increment when a Validation command is given (UCAM match successful). This mode is cleared when a CRC error is received or the chip is powered down.

For example, the chip verifier sends: a sync command (0x5695), a dummy word (bit 15 low), 0xE687, 0xD632, 0x2453, and 0x1FB7. A valid chip responds by sending a sync command and four words of data. The first word of data contains the reset count and configuration register data. The second through fourth words of data or identification data (ID1, ID2, ID3). The ID1, ID2 and ID3 words are values that are set when the chip is programmed. They do not change and their only use is to inform the chip checker what tag was programmed. The programming software sets these values as: ID1-000x, where x is first (MSN) nibble of serial number; ID2-yyyy, where yyyy is the lower 4 nibbles of serial number; and ID3-zzzz, where zzzz is the type code. The type code indicates which type of imaging device the chip is designed to operate in. Also, the type code indicates if the chip is a universal chip, a multi-brand chip, or a multi-region chip.

In another embodiment, chip check commands are used to verify the chip. The chip check commands are intended to be executed by an external device capable of driving the chip and executing the command protocols (for example the chip verifier). A chip check command can be executed at any time.

The chip check command is similar to a standard read or write command except the sync value. For example, the chip check command uses a sync value of 0x 4e. The upper bits, which are normally unused in the command field are used to decode the chip check command. The command fields are defined as follows:

TABLE 1

| | Sync | Command | Address | Data | CRC | Sync |
|---|---|---|---|---|---|---|
| Test Read | 0x4e | 0xa0 | 0x4 | x | Y | 0x1b |
| Test Write | 0x4e | 0xa2 | 0x4 | bits[31:0] | Y | 0x1b |
| Change Type | 0x4e | 0xd2 | 0x4 | bits[47:32] bits[31:16] | Y | 0x1b |
| View Text | 0x4e | 0xd0 | bits[5:0] | x | Y | 0x1b |
| View CSR | 0x4e | 0xf0 | x | x | Y | 0x1b |

TABLE 2

| | Sync | Command | Address | Data | CRC | Sync |
|---|---|---|---|---|---|---|
| Test Read | 0x4e | 0xa0 | 0x4 | x | Y | 0x1b |
| Test Write | 0x4e | 0xa2 | 0x4 | bits[31:0] | Y | 0x1b |
| Change Type | 0x4e | 0xd2 | 0x4 | bits[31:24] bits[15:00] | Y | 0x1b |
| View Text | 0x4e | 0xd0 | bits[4:0] | x | Y | 0x1b |
| View CSR | 0x4e | 0xf0 | x | x | Y | 0x1b |

The read and write test commands are used to validate successful read and write sequences as well as testing internal data buses and memory control functions. The test write command transfers data to the memory test area while the test read command reads from this area.

The view text command accesses a four byte buffer that contains ASCII information about the selected chip type. These locations are accessed by bits 0:1 of the address field. Bits 5:2 of the address field select the text area. Note that bit 5 is inverted, ie, a value of 0x7 selects the last text field (15) while a value of 0xf selects text field 7.

The view CSR command displays the CSR bits (47:40) in response bits [31:24] which indicates the selected chip type as well as other control information. It also displays CSR bits (39:16) in response bits [23:0].

The change type command writes bits [47:40] of the control and status register. This write occurs successfully if the transaction count is greater than 0. Only these eight bits are written by this command.

Such testing of the inkjet chip allows the remanufacturer to verify the operation of the inkjet chip without subjecting the remanufactured inkjet cartridge to some type of print testing. Print testing is generally not practical with inkjet chips as the inkjet chip would interpret the test as the first installation, causing the inkjet to store an incorrect installation date in chip memory and possibly limiting the warranty period.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A system for verifying a chip that is designed to be mounted on an imaging cartridge, the system comprising:
   means for sending a sync signal to the chip;
   means for sending a dummy word with a valid read command to the chip;
   means for sending a first value to the chip;
   means for sending a second value to the chip;
   means for sending a third value to the chip;
   means for sending a fourth value to the chip;
   means for checking for a response from the chip, wherein the chip responds with a sync and four values if the chip has been verified and the chip does not respond if it has not been verified; and
   means for determining at least one type of imaging cartridge that the chip will work properly when the chip is mounted thereon.

2. The system of claim 1, wherein the first value is a reset count and configuration register command.

3. The system of claim 1, wherein the second value, the third value, and the fourth value are values that are set when the chip is programmed.

4. The system of claim 3, wherein the second value is 000x, wherein x is a first nibble of a serial number.

5. The system of claim 3, wherein the third value is a lower four nibbles of a serial number.

6. The system of claim 3, wherein the fourth value is a type code, wherein the type code indicates the type of imaging device or devices that the chip may operate in.

7. The system of claim 1, wherein the imaging cartridge is an inkjet cartridge.

8. The system of claim 1, wherein the imaging cartridge is a toner cartridge.

* * * * *